United States Patent
Emadi et al.

(10) Patent No.: US 10,371,578 B2
(45) Date of Patent: Aug. 6, 2019

(54) THERMAL MANAGEMENT OF THERMAL SENSOR IN A MOBILE DEVICE

(71) Applicant: Maxim Integrated Products, Inc., San Jose, CA (US)

(72) Inventors: Arvin Emadi, San Jose, CA (US); Jerome C. Bhat, Palo Alto, CA (US)

(73) Assignee: MAXIM INTEGRATED PRODUCTS, INC., San Jose, CA (US)

( * ) Notice: Subject to any disclaimer, the term of this patent is extended or adjusted under 35 U.S.C. 154(b) by 797 days.

(21) Appl. No.: 14/865,641

(22) Filed: Sep. 25, 2015

(65) Prior Publication Data
US 2016/0305829 A1  Oct. 20, 2016

Related U.S. Application Data

(60) Provisional application No. 62/147,196, filed on Apr. 14, 2015.

(51) Int. Cl.
*G01J 5/08* (2006.01)
*G01J 5/12* (2006.01)
*G01J 5/16* (2006.01)

(52) U.S. Cl.
CPC .............. *G01J 5/12* (2013.01); *G01J 5/0812* (2013.01); *G01J 5/0881* (2013.01); *G01J 5/16* (2013.01)

(58) Field of Classification Search
CPC .... G01J 5/12; G01J 5/16; G01J 5/0881; G01J 5/0812
See application file for complete search history.

(56) References Cited

U.S. PATENT DOCUMENTS

| | | | | |
|---|---|---|---|---|
| 5,467,251 A | * | 11/1995 | Katchmar | H01L 23/3672 174/252 |
| 6,844,606 B2 | * | 1/2005 | Logsdon | H01L 23/10 250/338.1 |
| 7,276,697 B2 | * | 10/2007 | Devine | G01J 5/06 250/338.1 |
| 2002/0079566 A1 | * | 6/2002 | Majid | H01L 23/147 257/685 |
| 2014/0036953 A1 | * | 2/2014 | Kimura | G01J 5/16 374/121 |
| 2014/0167619 A1 | * | 6/2014 | Land | G01J 1/44 315/152 |
| 2015/0308899 A1 | * | 10/2015 | Buydens | G01J 5/045 250/338.4 |

* cited by examiner

*Primary Examiner* — Natalie Huls
*Assistant Examiner* — Janice M Soto
(74) *Attorney, Agent, or Firm* — Kevin E. West; Advent, LLP

(57) ABSTRACT

A mobile thermal sensor system, a mobile device case, and a process for fabricating a mobile thermal sensor system are described that include using a heat spreader (e.g., a heat sink). In an implementation, the mobile thermal sensor system includes a substrate configured to support an electrical component; a thermal detector package coupled to the substrate, the thermal detector package including a first thermopile, a second thermopile, and a reference temperature detector; and a heat spreader coupled to the substrate. In another implementation, a mobile device case can include a case configured to house a mobile device, where the mobile device includes a mobile thermal sensor system.

16 Claims, 6 Drawing Sheets

THERMAL MANAGEMENT OF THERMAL SENSOR IN A MOBILE DEVICE

CROSS-REFERENCE TO RELATED APPLICATIONS

The present application claims the benefit under 35 U.S.C. § 119(e) of U.S. Provisional Application Ser. No. 62/147,196, filed Apr. 14, 2015, and titled "THERMAL SENSOR SYSTEM WITH HEAT SPREADER AND METHOD." U.S. Provisional Application Ser. No. 62/147,196 is herein incorporated by reference in its entirety.

BACKGROUND

A thermopile can include an electronic device that converts thermal energy into electrical energy. It can be composed of several thermocouples often connected in series or in parallel. Thermopiles do not respond to absolute temperature, but generate an output voltage proportional to a local temperature difference or a temperature gradient. The output voltage of a thermopile can be in the range of tens or hundreds of microvolts. A thermopile can be used to generate electrical energy from, for instance, heat from electrical components, solar wind, radioactive materials, or combustion.

SUMMARY

A mobile thermal sensor system, a mobile device case, and a process for fabricating a mobile thermal sensor system are described that include using a heat spreader (e.g., a heat sink). In an implementation, the mobile thermal sensor system includes a substrate configured to support an electrical component; a thermal detector package coupled to the substrate, the thermal detector package including a first thermopile, a second thermopile, and a reference temperature detector; and a heat spreader coupled to the substrate. In another implementation, a mobile device case can include a case configured to house a mobile device, where the mobile device includes a mobile thermal sensor system including a substrate configured to support an electrical component; a thermal detector package coupled to the substrate, the thermal detector package including a first thermopile, a second thermopile, and a reference temperature detector; and a first heat spreader coupled to the substrate; an opening in the case; and a second heat spreader disposed on the case and proximate to the opening, where the heat spreader is configured to contact the mobile thermal sensor system and disperse heat.

In an implementation, a process for fabricating a mobile thermal sensor system that employs example techniques in accordance with the present disclosure includes reflowing a thermal detector package onto a substrate, where the thermal detector package includes at least a first thermopile, a second thermopile, and a reference temperature detector; and placing a heat spreader on the substrate.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DRAWINGS

The detailed description is described with reference to the accompanying figures. The use of the same reference numbers in different instances in the description and the figures may indicate similar or identical items.

DETAILED DESCRIPTION

Overview

Figure 1A:
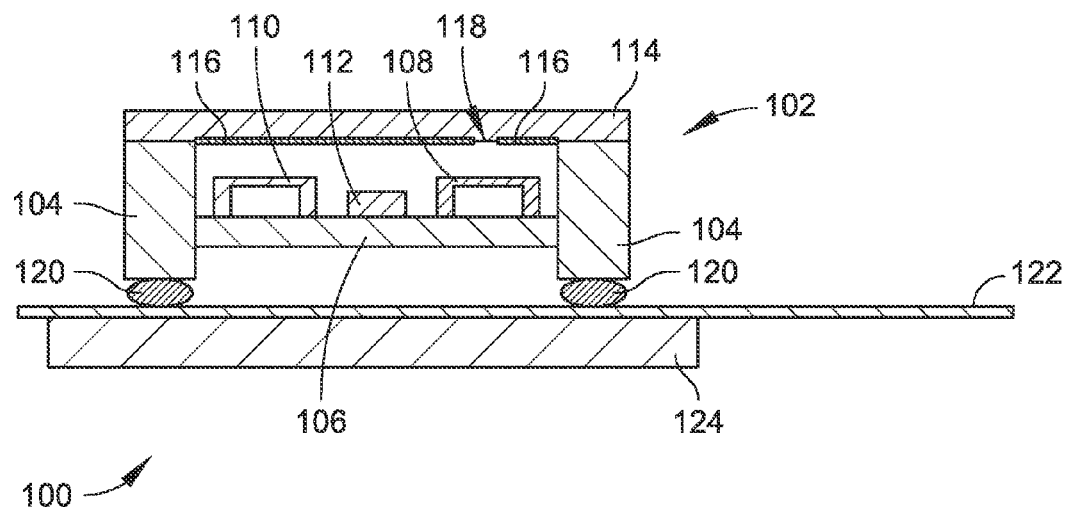
FIG. 1A is a cross section side view illustrating an embodiment of a mobile thermal sensor system and thermopile detector package that includes a heat spreader, in accordance with an example implementation of the present disclosure.

Temperature sensing devices are becoming more prevalent in portable electronic devices. Thermopiles are often used for temperature sensing in semiconductor and electronic devices, such as non-contact temperature measurement devices.

Most temperature sensing devices and systems work well when there is not a thermal gradient in the package. However, many devices create heat internally or are subject to external heat, which can create a thermal fluctuations and a heat gradient, such as a lateral heat gradient, and can create an error when measuring a temperature. Temperature measurement devices, especially a thermopile system, can be sensitive to a lateral heat gradient in the x-y direction. This can become an issue when the thermopile system is placed in a device where there are heat sources that spread heat across the device from different directions. For example, some thermopile systems may have two thermopiles, with the purpose of one thermopile to detect external radiation and a second thermopile to remove and compensate for a vertical heat gradient. However, this only works if the two thermopile detectors are at the same temperature. If they are not at the same temperature (sometimes caused by a lateral heat gradient), then a temperature measurement error may be amplified.

Accordingly, a mobile thermal sensor system, a mobile device case, and a process for fabricating a mobile thermal sensor system are described that include using a heat spreader (e.g., a heat sink). In an implementation, the mobile thermal sensor system includes a substrate configured to support an electrical component; a thermal detector package coupled to the substrate, the thermal detector package including a first thermopile, a second thermopile, and a reference temperature detector; and a heat spreader coupled to the substrate. In another implementation, a mobile device case can include a case configured to house a mobile device, where the mobile device includes a mobile thermal sensor system including a substrate configured to support an electrical component; a thermal detector package coupled to the substrate, the thermal detector package including a first thermopile, a second thermopile, and a reference temperature detector; and a first heat spreader coupled to the substrate; an opening in the case; and a second heat spreader disposed on the case and proximate to the opening, where the heat spreader is configured to contact the mobile thermal sensor system and disperse heat.

In an implementation, a process for fabricating a mobile thermal sensor system that employs example techniques in accordance with the present disclosure includes reflowing a thermal detector package onto a substrate, where the thermal detector package includes at least a first thermopile, a second thermopile, and a reference temperature detector; and placing a heat spreader on the substrate.

The mobile thermal sensor system and the mobile device case disclosed herein function to eliminate or substantially eliminate the disturbance of thermal fluctuations and gradients in mobile or other handheld devices and allow for accurate operation of the thermal detector/sensor, especially in noncontact pyrometry, for example a thermopile system. The mobile thermal sensor system may be used in a variety of systems, for example NIR LWIR spectroscopic sensors (e.g., for gas-sensing, etc.).

Example Implementations

Figure 1B:
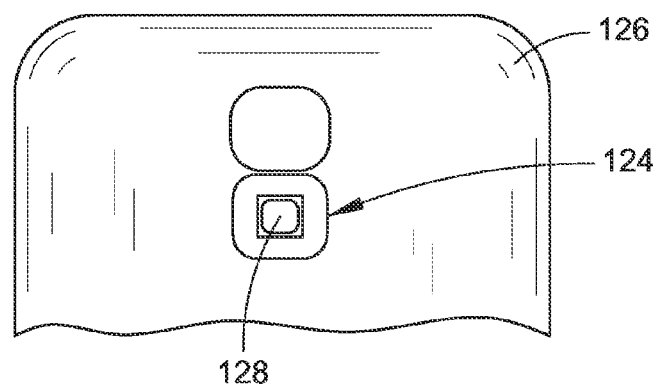
FIG. 1B is a partial plan view illustrating an embodiment of a case that includes an opening and a heat spreader, in accordance with an example implementation of the present disclosure.
Figure 1C:
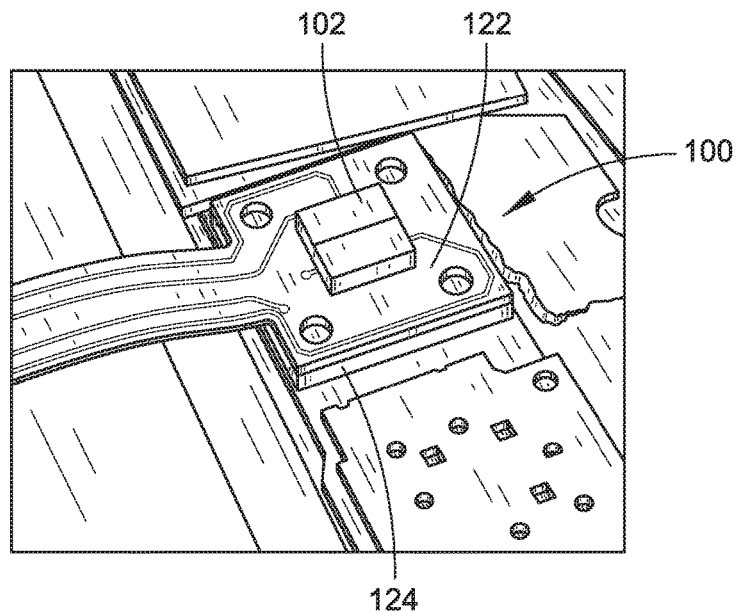
FIG. 1C is an isometric view illustrating an embodiment of a mobile thermal sensor system and thermopile detector package that includes a heat spreader, in accordance with an example implementation of the present disclosure.

FIGS. 1A through 1C illustrate a mobile thermal sensor system 100 and a thermal detector package 102 in accordance with an example implementation of the present disclosure. Additionally, a case 126 configured with a heat spreader 124 is described that can be used with, for example, a mobile device. In implementations, the mobile device may be configured to be relatively small and mobile (e.g., weighing less than 2 pounds). Some examples of a mobile device can include a smart phone, a cell phone, a wearable (e.g., a watch), and/or a tablet computer. It is contemplated that other types of mobile devices may be utilized.

As shown in FIGS. 1A through 1C, the thermal detector package 102 can include a package 104 and a package substrate 106. The package 104 can include different types of materials and/or configurations. For example, the package 104 can include a ceramic-based material. In other examples, the package 104 can include a silicon-based material, metal, metal alloys (e.g., nickel-cobalt ferrous alloy (Kovar)), and/or a polymer-based material. In a specific embodiment, a package 104 can include a ceramic package with a package substrate 106 configured with at least one wall that defines a cavity configured to house a first thermopile 108, a second thermopile 110, and/or a reference temperature detector 112. The first thermopile 108 and the second thermopile 110 may be fabricated on the same die. In another specific embodiment, a package 104 can include a silicon-based material with four walls combined with a package substrate 106, also including a silicon-based material. The package substrate 106 can be configured to mechanically and/or electrically support electrical devices, such as the first thermopile 108, the second thermopile 110, the reference temperature detector 112, and/or other components. The package 104 can also be configured to mechanically and/or electrically support a package lid 114. At least some of these features (e.g., package 104, package substrate 106, etc.) can be configured to facilitate electrical interconnections (e.g., a through-substrate via, a redistribution layer, metal lines, etc.).

As illustrated in FIGS. 1A through 1C, the mobile thermal sensor system 100 can further include a first thermopile 108, a second thermopile 110, and a reference temperature detector 112. In implementations, the mobile thermal sensor system 100 can include additional thermopile devices. A thermopile (e.g., the first thermopile 108, the second thermopile 110, additional thermopile devices) can include at least one thermocouple, which can detect infrared radiation that is incident upon the thermocouple/thermopile device and convert the infrared radiation/thermal energy into electrical energy. The thermocouple can include a temperature-measuring device having two dissimilar conductors that contact each other at one or more spots (e.g., a hot junction, a cold junction) where a temperature differential is experienced by the different conductors (or semiconductors). In these implementations, the thermopile (e.g., first thermopile 108, a second thermopile 110, etc.) can detect infrared radiation and provide a proportional electrical signal for determining an object's temperature. In embodiments, the first thermopile 108 and/or the second thermopile 110 can be disposed on and/or within the package 104 and/or package substrate 106 and configured to be exposed to and/or receive light and/or electromagnetic radiation.

Additionally, the first thermopile 108, a second thermopile 110, and a reference temperature detector 112 can be electrically coupled to other components within the mobile thermal sensor system 100 and/or thermal detector package 102, for example, using electrical interconnections such as a redistribution layer, vias, metal wiring, metal traces, etc. In a specific embodiment, a first thermopile 108 and/or second thermopile 110 utilized in a thermal sensor system 100 and thermal detector package 102 can be configured to be exposed to light and/or infrared radiation through an aperture 118 in a package lid 114, further described below. In this embodiment, the thermal detector package 102 can be configured to receive and/or detect electromagnetic energy (e.g., energy from a human or other object) external to the thermal detector package 102 and/or mobile thermal sensor system 100.

As illustrated in FIG. 1A, the thermal detector package 102 can include a package lid 122 disposed on the package 104. In some embodiments, the package lid 122 can be hermetically sealed to the package 104. The package lid 122 and the package 104 can define a cavity that houses the first thermopile 108, the second thermopile 110, and/or the reference temperature detector 112. In one specific embodiment, the package lid 122 may include a silicon lid. It is contemplated that the package lid 122 can include other materials. In some embodiments, the package lid 122 can be electrically interconnected with the package 104. In a specific example, the package lid 122 can be made by placing a piece or substrate of silicon in the aperture 118 of a metal lid (e.g., nickel-cobalt ferrous alloy).

In some embodiments, the package lid 122 may include a metal layer 116 disposed on at least one side of the package lid 122. The metal layer 116 may be configured to serve as a light blocking layer and/or a light absorbing layer for the thermal detector package 102 and/or to ensure that little or no light passes through the package lid 122 and into the cavity. In one specific embodiment, the metal layer 116 can be disposed on a side of the package lid 122 configured to be exposed to the cavity. It is contemplated that the metal layer 116 can be disposed and configured other ways, such as on the top of the package lid 122 (e.g., on a side distal from cavity). In some embodiments, the metal layer 116 and/or the package lid 122 may include an aperture 118 configured to allow some light and/or infrared radiation into the cavity and/or be incident upon a first thermopile 108 and/or a second thermopile 110.

Thermal sensor system 100 can include a thermal detector package 102 disposed on a substrate 122. In implementations, the substrate 122 can be configured to mechanically and/or electrically support the thermal detector package 102. Some examples of substrate 122 may include a printed circuit board and/or a flex circuit. The thermal detector package 102 can be coupled to a substrate 122, for example, using a connector 120 (e.g., a solder ball, a lead grid array (LGA)). In one specific example, a thermal detector package 102 may be coupled to a flex circuit using an array of solder balls.

Thermal sensor system 100 can include a heat spreader 124. In implementations, a heat spreader 124 can include a passive heat exchanger that cools by dissipating heat. In the embodiment shown in FIGS. 1A through 1C, the heat spreader 124 can serve to dissipate heat evenly in an x-y direction (e.g., parallel with the substrate 122 and/or the package substrate 106) within the thermal sensor system 100 and/or thermal detector package 102 so that the temperature of the first thermopile 108, the second thermopile 110, and the reference temperature detector 112 are the same or substantially the same. The heat spreader 124 may include a material with a high heat conductivity. For example, the heat spreader 124 can include a metal, such as an aluminum block. Even though the heat spreader 124 is shown as a block in FIGS. 1A and 1C, the heat spreader 124 may include a variety of sizes, shapes, and configurations. In one specific example, the heat spreader 124 can include an aluminum block disposed on the substrate 122 on a side opposite the thermal detector package 102. In another specific example, the heat spreader 124 can be disposed between the substrate 122 and the thermal detector package 102. In this specific embodiment, the heat spreader 124 may be coupled to the substrate 122 and the thermal detector package 102 or may be coupled to only the substrate 122 or only the thermal detector package 102. In some embodiments, the heat spreader 124 may include and/or be coupled to the substrate 122 and/or thermal detector package 102 with a thermally conductive adhesive.

In implementations, heat spreader 124 can include a material with a high thermal conductivity, especially in a lateral (e.g., x-y direction). For example, heat spreader 124 may include a piece of a high thermal conductivity metal or alloy, such as aluminum, copper, or their alloy. Some typical thermal conductivities of heat spreader 124 materials may range from 150 W/mK to 450 W/mK. In some specific instances, the heat spreader 124 material may include a special composite alloy with typical thermal conductivities in the range of 450 W/mK to 800 W/mK. Generally, a thinner piece of material can be used for the heat spreader 124 when the material thermal conductivity is high. In one specific embodiment, the heat spreader 124 may include multiple layers and/or materials. For example, the heat spreader 124 may include carbon and graphite materials (and/or graphene), such as carbon nanotubes or carbon nanofibers, which may have thermal conductivities up to 6000 W/mK. In other examples, heat spreader 124 may be a multilayer of alternating high thermal conductivity and thermal isolating layers. In a specific embodiment, a heat spreader 124 can include three (or more) layers with two high thermal conductivity graphite layers (sheets) separated by an insulating layer. Some examples of an insulating layer may include a gaseous (and/or porous) medium, such as air, nitrogen, NASBIS, etc. In another specific embodiment, the heat spreader 124 can include two layers with a first high thermal conductivity graphite sheet disposed on a second insulating layer. In these multilayer examples, having an alternating multilayer of high and low thermal conductivity materials may result in a more effective heat spreader 124.

As shown in FIG. 1B, a case 126 that may be configured to be utilized with a thermal sensor system 100 can include a heat spreader 124 and an opening 128. In implementations, the case 126 can include a housing for a device, such as a smart phone device. The case 126 may be removable or may be fixed in position. In the embodiment, shown in FIG. 1B, the case 126 may include an opening 128 configured for allowing radiation, heat, and/or light to pass through the case 126. A heat spreader 124 can be disposed proximate to the opening 128 and configured to contact an adjacent device (e.g., the thermal sensor system 100, the thermal detector package 102, etc.). In implementations, the case 126 with a heat spreader 124 can function to dissipate heat from the thermal detector package 102 (e.g., in the x-y direction) and provide a more constant heat environment for the thermal detector package 102.

Figure 1D:
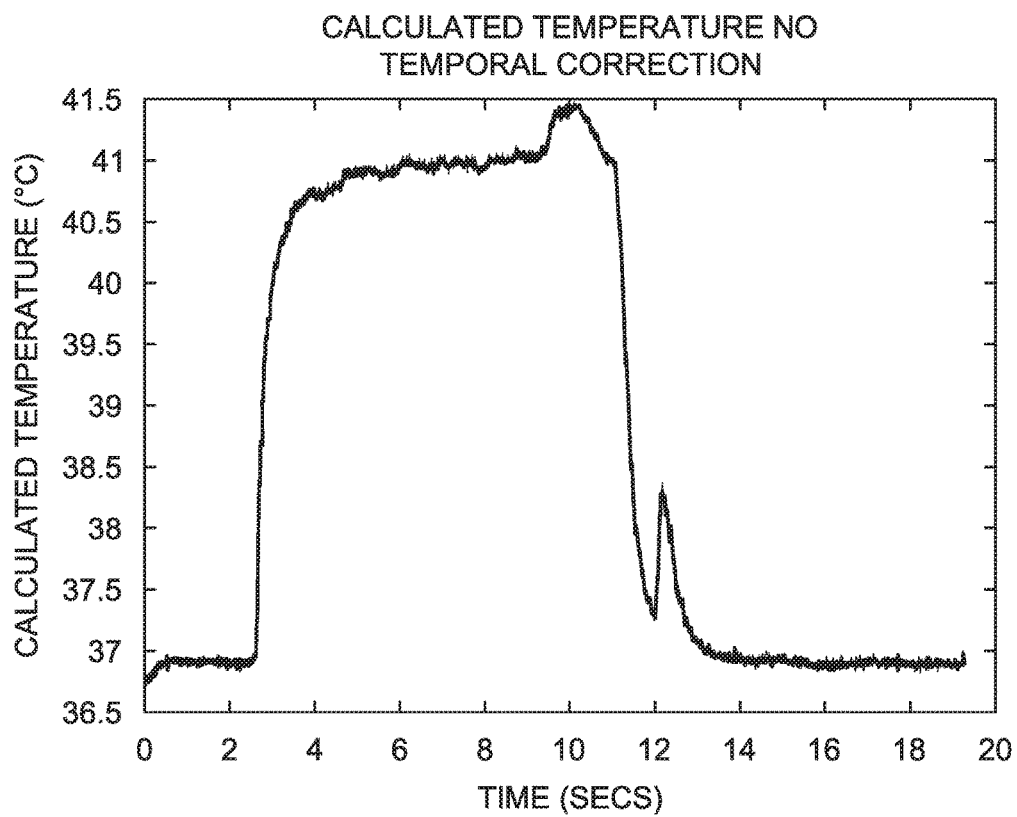
FIG. 1D is a graphical depiction illustrating a calculated temperature of the thermopile detector package versus time with no heat spreader, in accordance with an example implementation of the present disclosure.

FIG. 1D illustrates one example of a calculated temperature in a thermal sensor system 100 with no heat spreader 124 to compensate for a lateral or x-y thermal gradient. In this example, the thermal sensor measured a fixed object at 37° C. in real time while an application (e.g., a game) was started on the mobile device. As shown in FIG. 1D, the temperature within a thermal sensor system 100 and thermal detector package 102 significantly increases (in this example with an error of about 4° C.) when an application (e.g., a game) or other means for heat generation is executed. This temperature and heat increase negatively affect the thermal detector package 102 and associated temperature measurement due to the error caused by the excess heat.

Figure 1E:
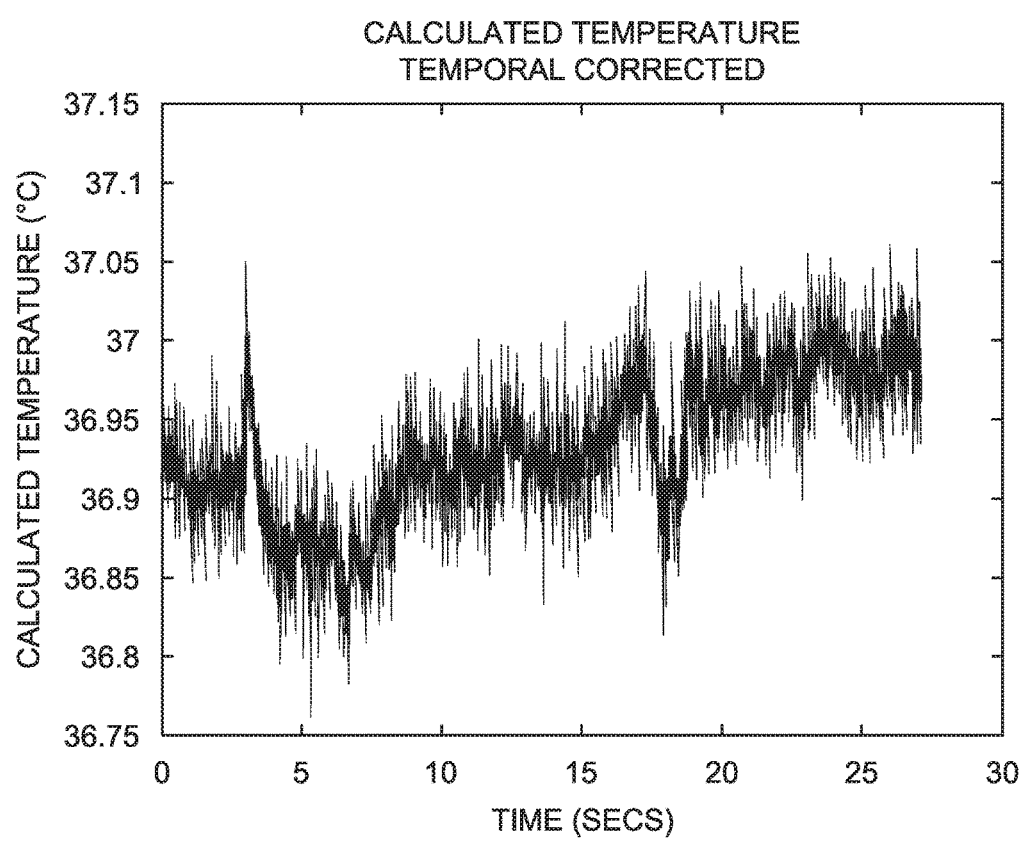
FIG. 1E is a graphical depiction illustrating a calculated temperature of the thermopile detector package versus time with a heat spreader for dissipating heat, in accordance with an example implementation of the present disclosure.

FIG. 1E illustrates one example of a calculated temperature in a thermal sensor system 100 when a heat spreader 124 is used to minimize a lateral or x-y thermal gradient. In this example, the resulting calculated temperature (using the same measurement conditions as the example in FIG. 1D) is more consistent when an application is initiated because the heat spreader 124 more effectively dissipates the excess heat and provides for a minimized lateral thermal gradient.

Example Processes

Figure 2:
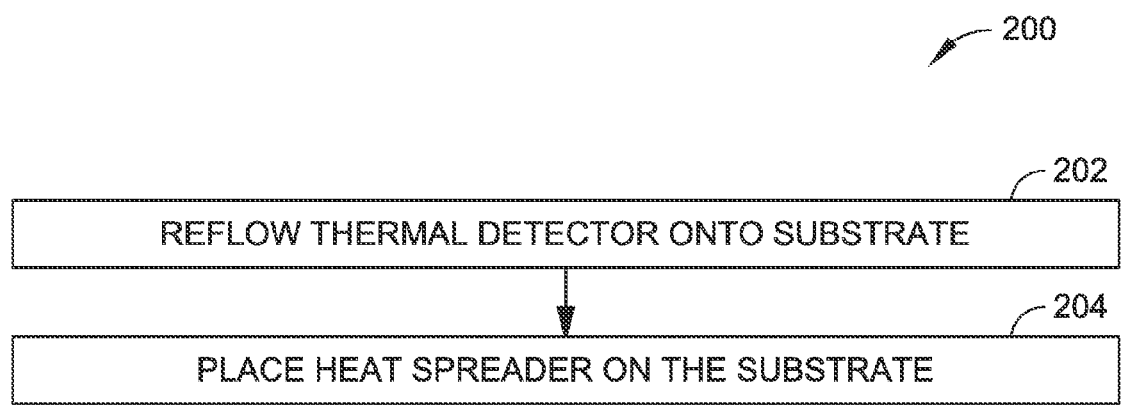
FIG. 2 is a flow diagram illustrating an example process for fabricating a mobile thermal sensor system that includes a heat spreader, such as the mobile thermal sensor system illustrated in FIGS. 1A through 1C.
Figure 3A:
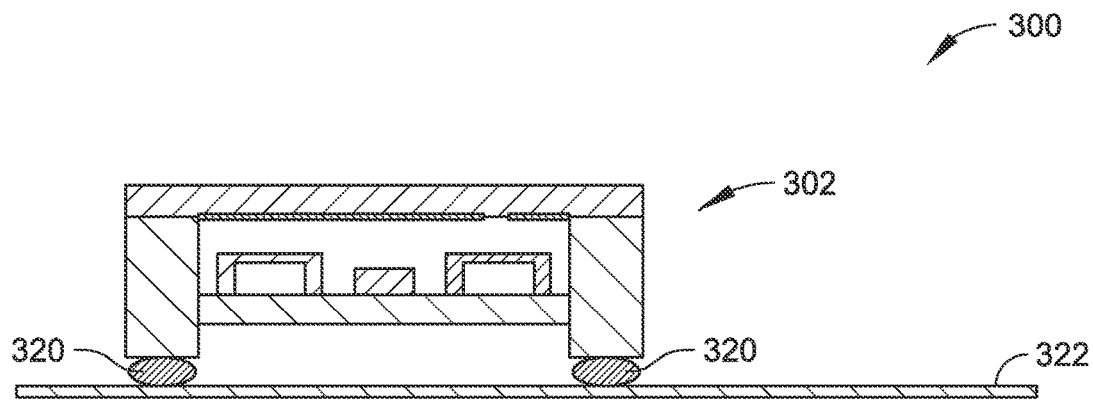
FIG. 3A is a diagrammatic partial cross-sectional side elevation view illustrating the fabrication of a mobile thermal sensor system, such as the mobile thermal sensor system shown in FIGS. 1A through 1C in accordance with the process shown in FIG. 2.
Figure 3B:
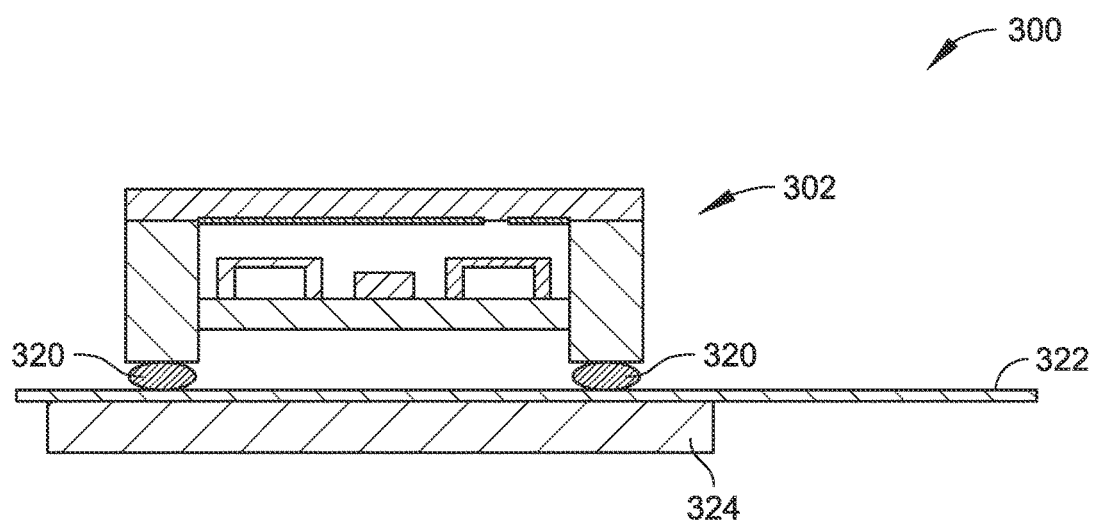
FIG. 3B is a diagrammatic partial cross-sectional side elevation view illustrating the fabrication of a mobile thermal sensor system with a heat spreader, such as the mobile thermal sensor system shown in FIGS. 1A through 1C in accordance with the process shown in FIG. 2.

FIG. 2 illustrates an example process 200 that employs techniques to fabricate thermopile temperature sensing devices, such as the mobile thermal sensor system 100 shown in FIGS. 1A through 1C. FIGS. 3A and 3B illustrate a section 300 of a mobile thermal sensor system 100 and thermal detector package 102 during fabrication for example those shown in FIGS. 1A through 1C).

As shown in FIG. 3A, a thermal detector package is reflowed onto a substrate (Block 202). In implementations, reflowing a thermal detector package 302 can include using a reflow process. A reflow process may include using heat (e.g., from a reflow oven, an infrared lamp, etc.) in a controlled process to melt a connector 320 (e.g., at least one solder bump) and permanently connect the connector 320 to the thermal detector package 302. In a specific embodiment, the thermal detector package 302 can be reflowed onto a substrate 322 prior to coupling a heat spreader 324 to the substrate 322.

Then, a heat spreader is placed on the substrate (Block 204). As shown in FIG. 3B, a heat spreader 324 may be placed or coupled to the substrate 322, for example, on a side of the substrate 322 opposite the thermal detector package 302. In some instances, placing or coupling the heat spreader 324 to the substrate 322 may include using a thermally conductive adhesive. It is contemplated that other adhesives or coupling methods may be used to place the heat spreader 324 on the substrate 322.

Figure 4:
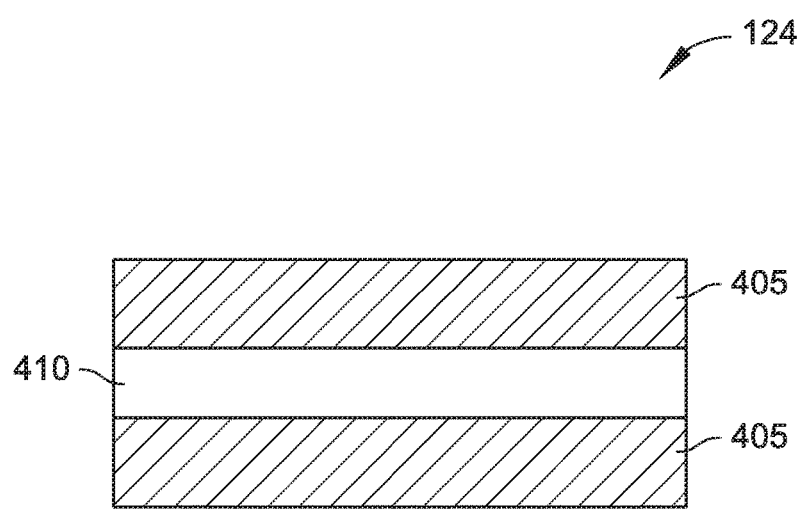
FIG. 4 is a diagrammatic representation of an embodiment of a heat spreader including a first thermally conductive layer, a second insulating layer, and a third thermally conductive layer.

Referring to FIG. 4, a diagrammatic representation of an embodiment of a heat spreader 124 including a first thermally conductive layer 405, a second insulating layer 410, and a third thermally conductive layer 405 is shown.

CONCLUSION

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:

1. A mobile thermal sensor system, comprising:
   a thermal detector package including
      a first thermopile,
      a second thermopile,
      a reference temperature detector, and
      a package substrate configured to support the first thermopile, the second thermopile and the reference temperature detector;
   a substrate having first and second opposing sides and configured to support the thermal detector package on the first side of the substrate; and
   a heat spreader coupled to the second side of the substrate.

2. The mobile thermal sensor system of claim 1, wherein the substrate includes a printed circuit board.

3. The mobile thermal sensor system of claim 1, wherein the substrate includes a flexible circuit board.

4. The mobile thermal sensor system of claim 1, wherein the heat spreader includes at least one of aluminum, silicon, or copper.

5. The mobile thermal sensor system of claim 1, wherein the heat spreader includes at least one of carbon, graphite, carbon nanotubes, or carbon nano-fibers.

6. The mobile thermal sensor system of claim 1, wherein the heat spreader includes
   a first thermally conductive layer;
   a thermally insulating layer, and
   a second thermally conductive layer, wherein the thermally insulating layer is disposed between the first thermally conductive layer and the second thermally conductive layer.

7. The mobile thermal sensor system of claim 6, wherein the thermally insulating layer includes at least one of a gaseous medium or a porous medium.

8. The mobile thermal sensor system of claim 7, wherein the gaseous medium includes air.

9. A mobile device case, comprising:
   a case configured to house a mobile device, where the mobile device includes a mobile thermal sensor system including
      a thermal detector package including
         a first thermopile,
         a second thermopile,
         a reference temperature detector, and
         a package substrate configured to support the first thermopile, the second thermopile and the reference temperature detector; and
      a substrate having first and second opposing sides and configured to support the thermal detector package on the first side of the substrate;
      a first heat spreader coupled to the second side of the substrate;
   an opening in the case; and
   a second heat spreader disposed on the case and proximate to the opening, where the second heat spreader is configured to contact the mobile thermal sensor system and disperse heat.

10. The mobile device case of claim 9, wherein the substrate includes a flexible circuit board.

11. The mobile device case of claim 9, wherein at least one of the first heat spreader or the second heat spreader includes at least one of aluminum, silicon, or copper.

12. The mobile device case of claim 9, wherein at least one of the first heat spreader or the second heat spreader includes at least one of carbon, graphite, carbon nanotubes, or carbon nano-fibers.

13. The mobile device case of claim 9, wherein the first heat spreader includes
   a first thermally conductive layer;
   a thermally insulating layer, and
   a second thermally conductive layer, the thermally insulating layer disposed between the first thermally conductive layer and the second thermally conductive layer, and wherein the thermally insulating layer includes at least one of a gaseous medium.

14. The mobile device case of claim 13, wherein the gaseous medium includes air.

15. A process for fabricating a mobile thermal sensor system, comprising:
   reflowing a thermal detector package onto a first side of a substrate, where the thermal detector package includes at least a first thermopile, a second thermopile, a reference temperature detector and a package substrate configured to support the first thermopile, the second thermopile and the reference temperature detector; and
   attaching a heat spreader on a second side of the substrate, the first and second sides of the substrate being opposing sides of the substrate.

16. The process for fabricating the mobile thermal sensor system of claim 15, wherein placing the heat spreader on the substrate include placing at least one of an aluminum heat spreader or a copper heat spreader on the substrate.

* * * * *